United States Patent [19]
Yuyama

[11] Patent Number: 5,533,606
[45] Date of Patent: Jul. 9, 1996

[54] APPARATUS FOR STORING AND TRANSPORTING DRUGS

[76] Inventor: Shoji Yuyama, 3-8, Hohnan-cho Nishi 4-chome, Toyonaka-shi, Osaka, Japan

[21] Appl. No.: 305,052

[22] Filed: Sep. 13, 1994

[51] Int. Cl.$^6$ ..................................................... B65G 37/00
[52] U.S. Cl. ................ 198/349; 53/168; 53/154; 221/76
[58] Field of Search ................... 198/349, 350, 198/370.01, 370.1, 465.2, 465.3, 358; 53/55, 168, 240, 237, 154; 221/69, 76, 130, 191, 192, 258, 2

[56] References Cited

U.S. PATENT DOCUMENTS

| | | | |
|---|---|---|---|
| 2,983,392 | 5/1961 | Ebbert | 198/370.01 |
| 3,294,282 | 12/1966 | Brown | 221/130 |
| 4,108,333 | 8/1978 | Falk et al. | 221/130 |
| 4,821,917 | 4/1989 | Brown | 221/69 |
| 4,870,799 | 10/1989 | Bergerioux et al. | 53/154 |
| 4,881,634 | 11/1989 | Stolzer | 198/370.01 |
| 4,958,716 | 9/1990 | Matsuo et al. | 198/465.1 |
| 5,094,184 | 3/1992 | Yamamoto et al. | 53/900 |
| 5,097,652 | 3/1992 | Inamura et al. | 53/154 |
| 5,351,801 | 10/1994 | Markin et al. | 198/349 |
| 5,447,017 | 9/1995 | Becher et al. | 53/168 |

*Primary Examiner*—William E. Terrell
*Assistant Examiner*—T. Kelly
*Attorney, Agent, or Firm*—Wenderoth, Lind & Ponack

[57] ABSTRACT

An apparatus is provided which can assign drugs to respective buckets running on a conveyor with accuracy and high efficiency and transport them. A case accommodates a plurality of storage/delivery conveyors. Near the drug inlets for the respective conveyors, displays are provided which indicate the prescription number. Buckets running on a conveyor each carry an IC card. A detector reads the data on the IC card of each bucket so that the drug indicated by the data will be discharged into a right bucket from the storage/delivery conveyor.

1 Claim, 6 Drawing Sheets

FIG. 3
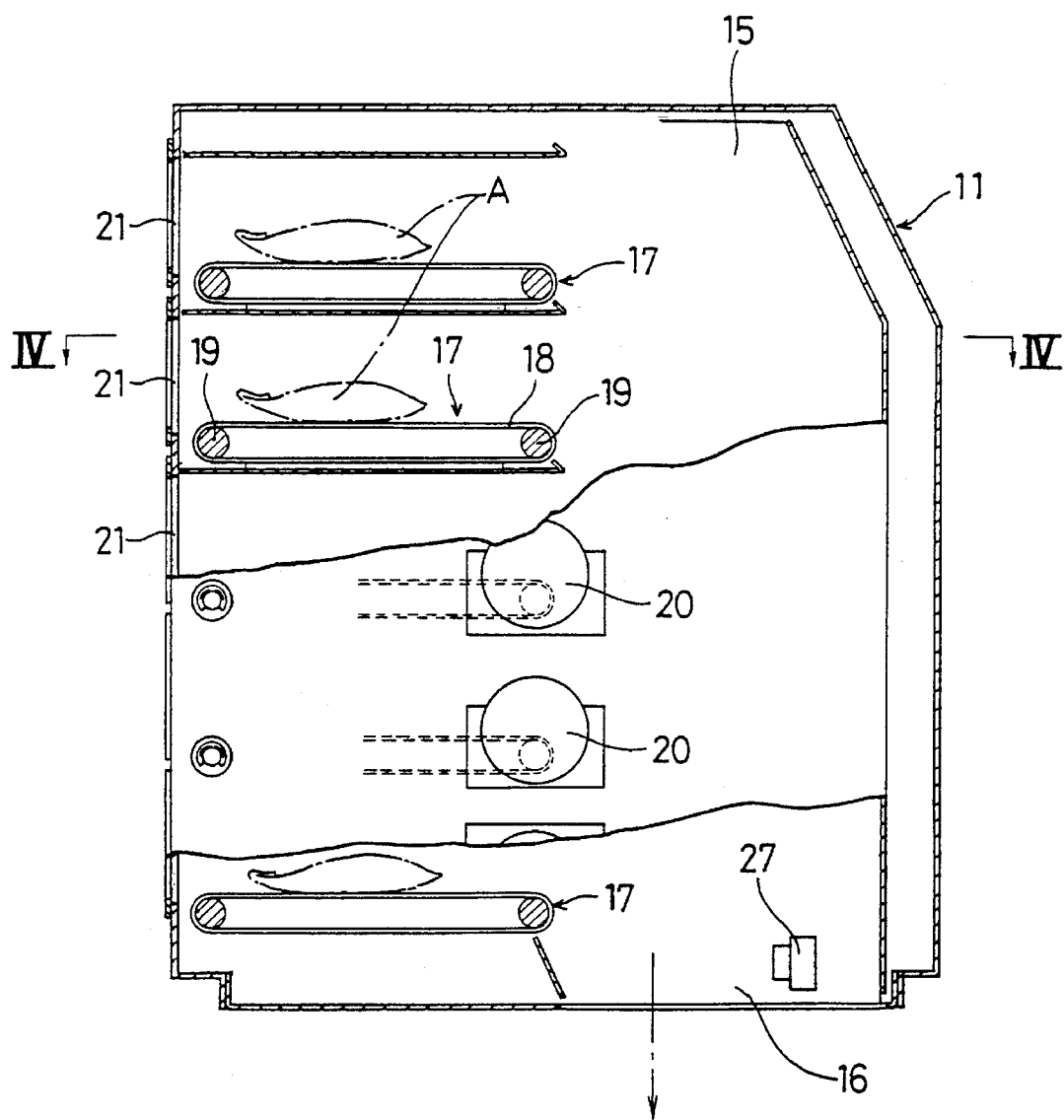
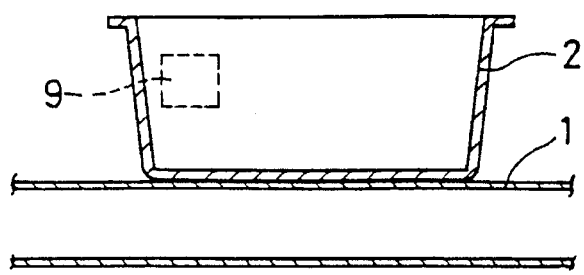

5,533,606

APPARATUS FOR STORING AND TRANSPORTING DRUGS

BACKGROUND OF THE INVENTION

This invention relates to an apparatus for temporarily storing drugs prepared according to prescriptions presented by doctors, sorting them according to patients, and transporting them.

Drugs are prepared according to prescriptions presented by doctors. In a drug division of a big hospital, powder drugs and tablets prepared by pharmacists are usually put in buckets that run on a conveyor and collected to one place. The drugs thus collected are inspected and handed to patients.

Powder drugs and tablets are usually packed mechanically with a packing machine. But some tablets are handed to patients as they are packed by the manufacturers. On the other hand, compresses and ointments, which are usually stored on shelves, are taken out of the shelves by the amounts specified in each specification and put in the bucket on the conveyor corresponding to the patient specified in the prescription.

Since drugs are put into the bucket corresponding to each patient by pharmacists, wrong drugs are often put into the bucket.

Also, it may take a long time to prepare drugs for a certain patient. In such a case, not only the bucket for this patient but all the other buckets on the same conveyor have to be stopped. Thus, operation efficiency extremely drops because preparation for other patents' drugs, which can be otherwise prepared in a shorter time (especially if powder drugs are to be prepared), is also delayed.

It is an object of this invention to provide a device which can temporarily store prepared drugs and mechanically deliver them into designated buckets that are moving on a predetermined feed path and which can thus collect drugs into predetermined buckets with high accuracy and transport such buckets with high efficiency.

SUMMARY OF THE INVENTION

In order to achieve this object, according to this invention, there is provided an apparatus for storing and transporting drugs comprising a case having a drug discharge opening, a plurality of storage/delivery means mounted in the case for storing drugs and discharging them toward the drug discharge opening, the case further having a plurality of drug inlets corresponding to the respective storage/delivery means, driving means for the storage/delivery means, displays provided near the respective drug inlets and drivingly associated with the driving means, a plurality of buckets each bearing specific identification data and adapted to run along a passage connected to the drug discharge opening formed in the case, and a detector for detecting the identification data of each bucket to send signals for driving the driving means for each storage/delivery means.

The drugs to be inserted in each inlet formed in the case are designated by sending external signals to the corresponding display and indicating thereon the code that specifies the prescription data such as the prescription number or the patient's code. A pharmacist packs drugs according to the prescription and puts the thus prescribed drugs into the storage/delivery means through a designated inlet. The drugs are temporarily stored in the storage/delivery means.

When the detector detects the bucket bearing the identification data corresponding to the prescription, the storage/delivery means will activate, delivering the drugs stored therein into the bucket. Then, the display is reset. When the next external signals are transmitted, the above operation is repeated.

According to this invention, drugs are put into the case according to the information indicated on the displays; a corresponding bucket on the conveyor is detected according to the identification information; and the drugs stored in the case are delivered into the corresponding bucket. Thus, it is possible to deliver drugs into the respective buckets by mechanical means and collect and transport drugs with high accuracy and efficiency.

Other features and objects of the present invention will become apparent from the following description made with reference to the accompanying drawings, in which:

BRIEF DESCRIPTION OF THE DRAWINGS

FIG. 3 is a partially vertical sectional side view of the same;

DETAILED DESCRIPTION OF THE PREFERRED EMBODIMENT

Figure 1:
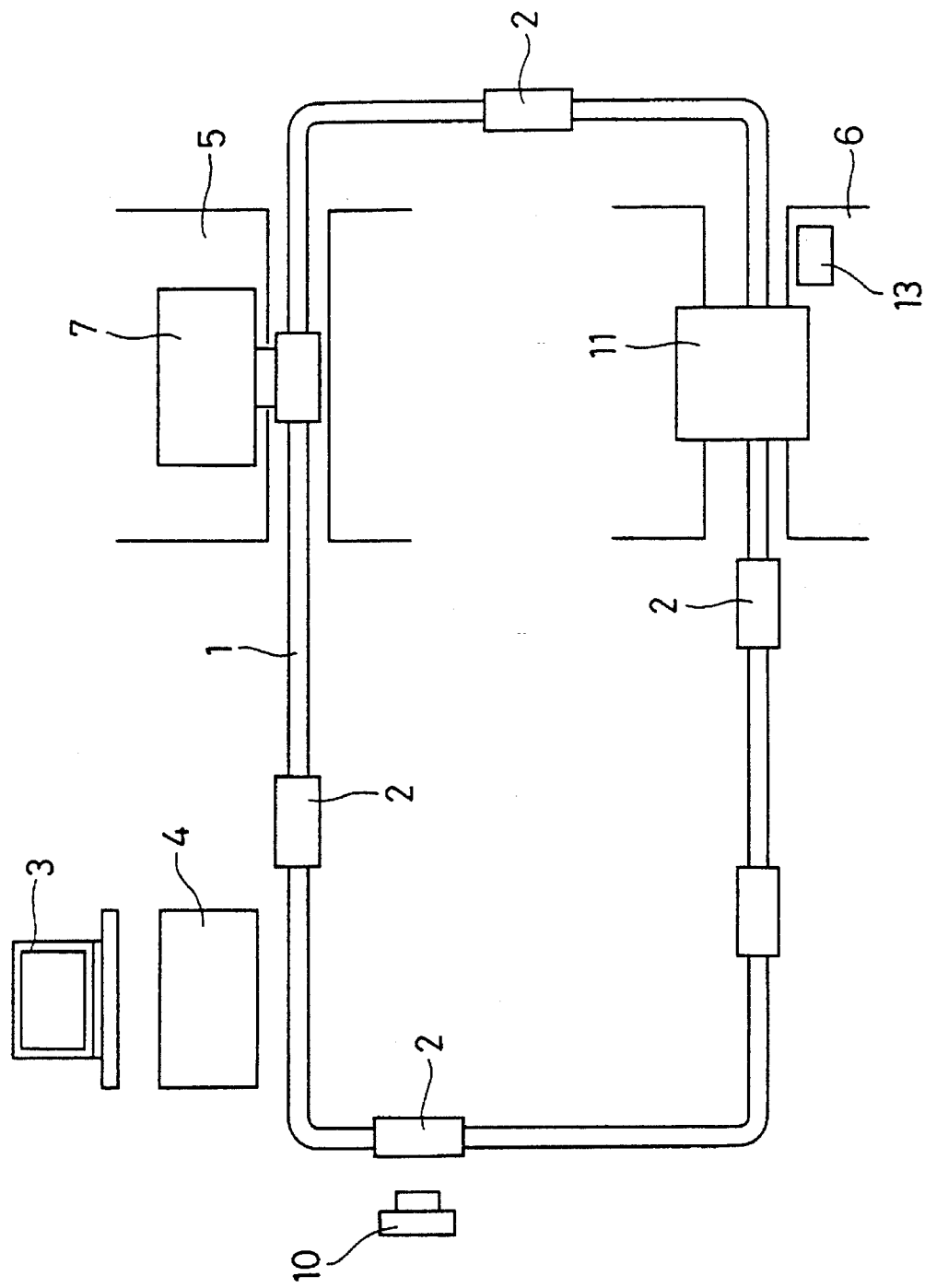
FIG. 1 is a view schematically showing the drug carrier system of this invention.

FIG. 1 schematically shows a carrier system for collecting and carrying drugs which comprises a conveyor and buckets.

In FIG. 1, numeral 1 indicates a conveyor forming a loop. A plurality of buckets 2 are supported on and movable along the conveyor 1.

Near the starting point of the conveyor 1 is a data input device 4 connected to a host computer 3. Through the data input device 4, the prescription data contained in prescriptions issued by doctors, such as their numbers, patient codes, etc. are inputted to the host computer 3.

Along the conveyor 1 are a boot 5 for packing powder drugs, and a boot 6 for manually packing drugs in the form of tablets. The boot 6 carries a storage/carrier device 11 and a printer 13.

Figure 6:
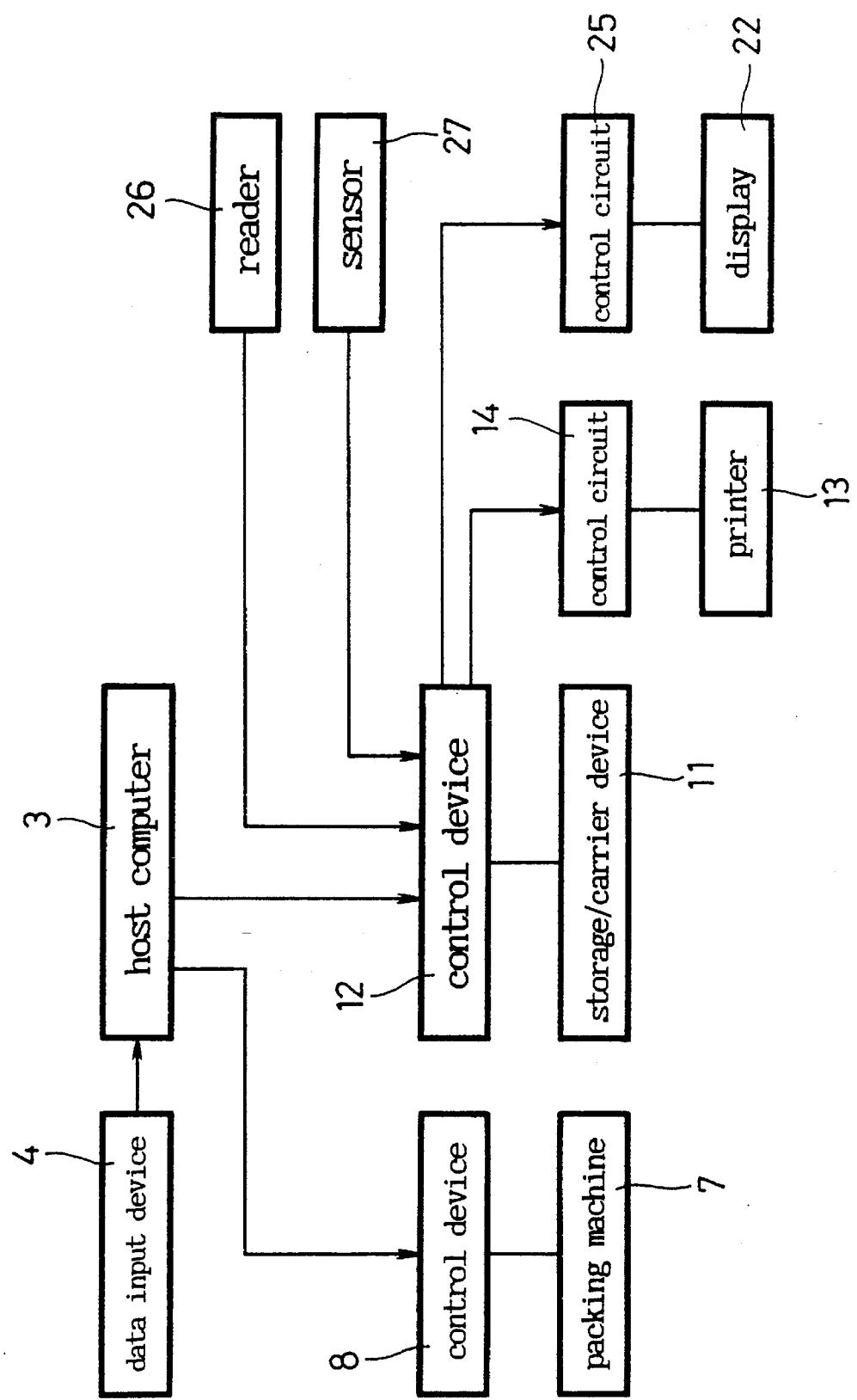
FIG. 6 is a block diagram of the control unit of the same.
Figure 7:
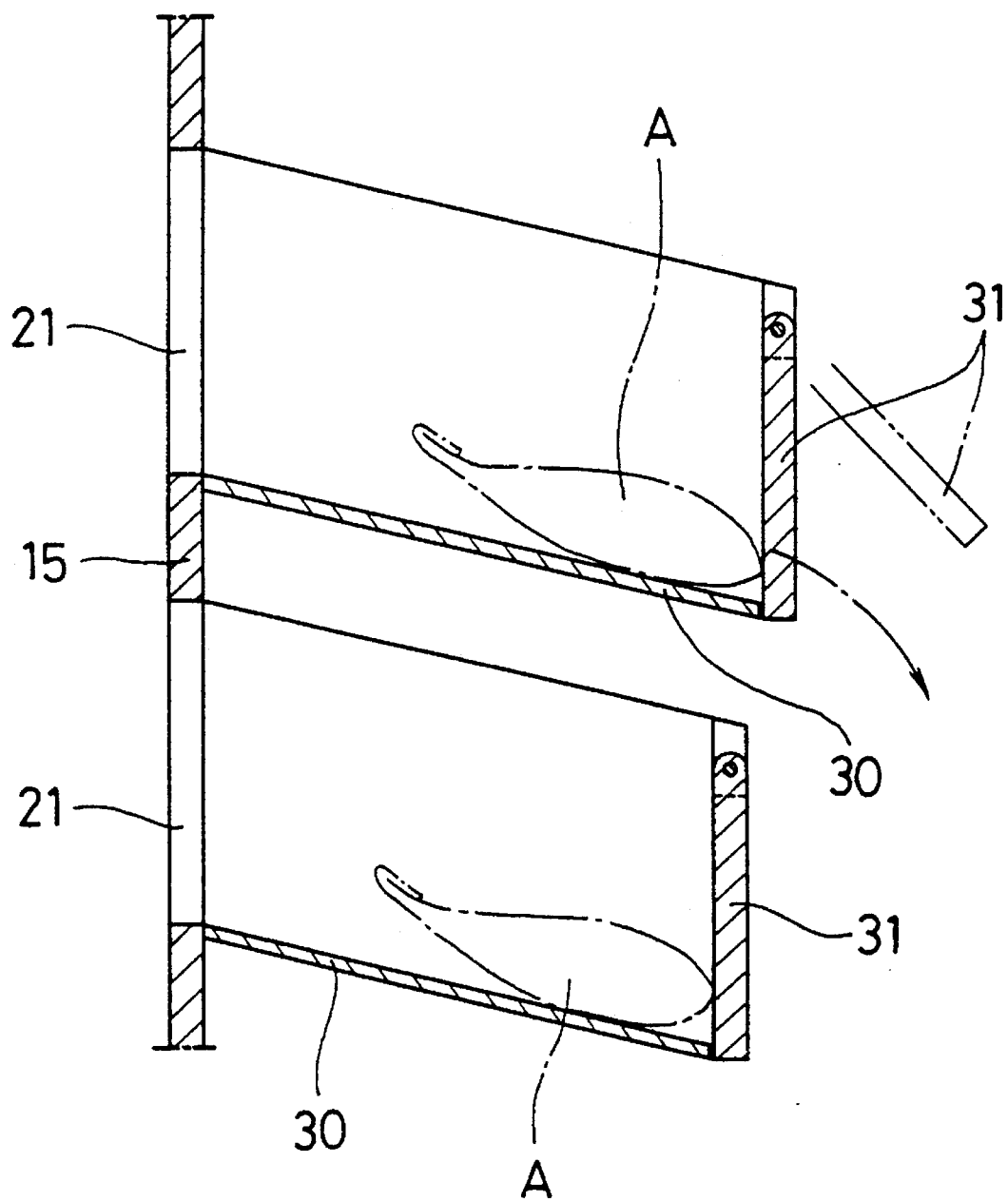
FIG. 7 is a sectional view of another embodiment.

As shown in FIG. 6, the storage/carrier device 11 has a control device 12 which is connected to a control device 14 of the printer 13. The control device 12 and a control device 8 of a packing machine 7 are connected to the host computer 3. Thus, the prescription data stored in the host computer 3 can be transferred on-line into these control devices.

Figure 2:
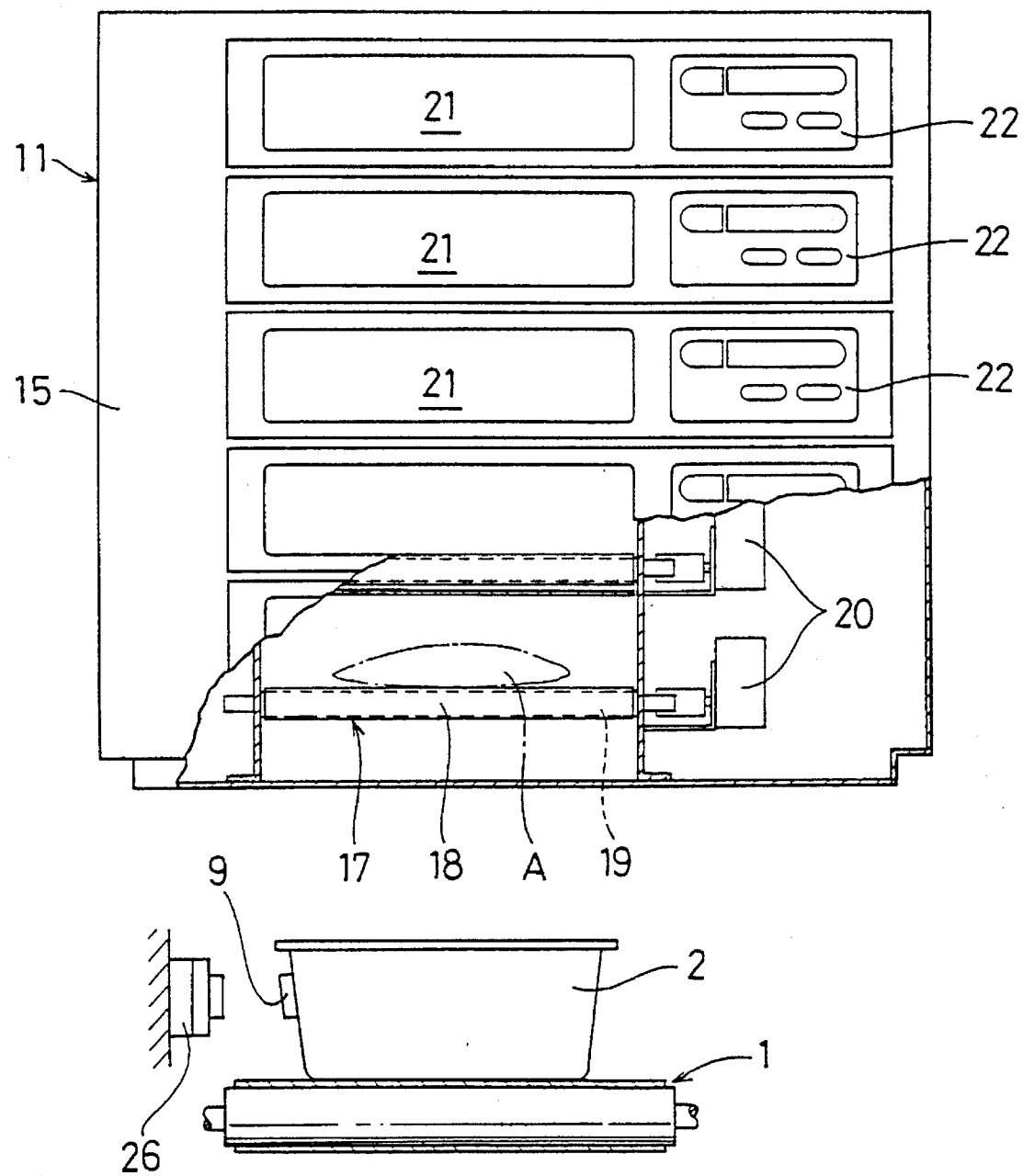
FIG. 2 is a front view partially in vertical section of the storage/carrier device of one embodiment.

Each of the buckets 2 shown in FIGS. 1–3 is assigned to one patient. A non-contact type IC card 9 is attached to one side of each bucket. This IC card 9 is a read/write IC memory. The prescription number and patient identification data corresponding to a patient code that are stored in the host computer 3 are written in each IC card by an optical transmitter 10.

Figure 4:
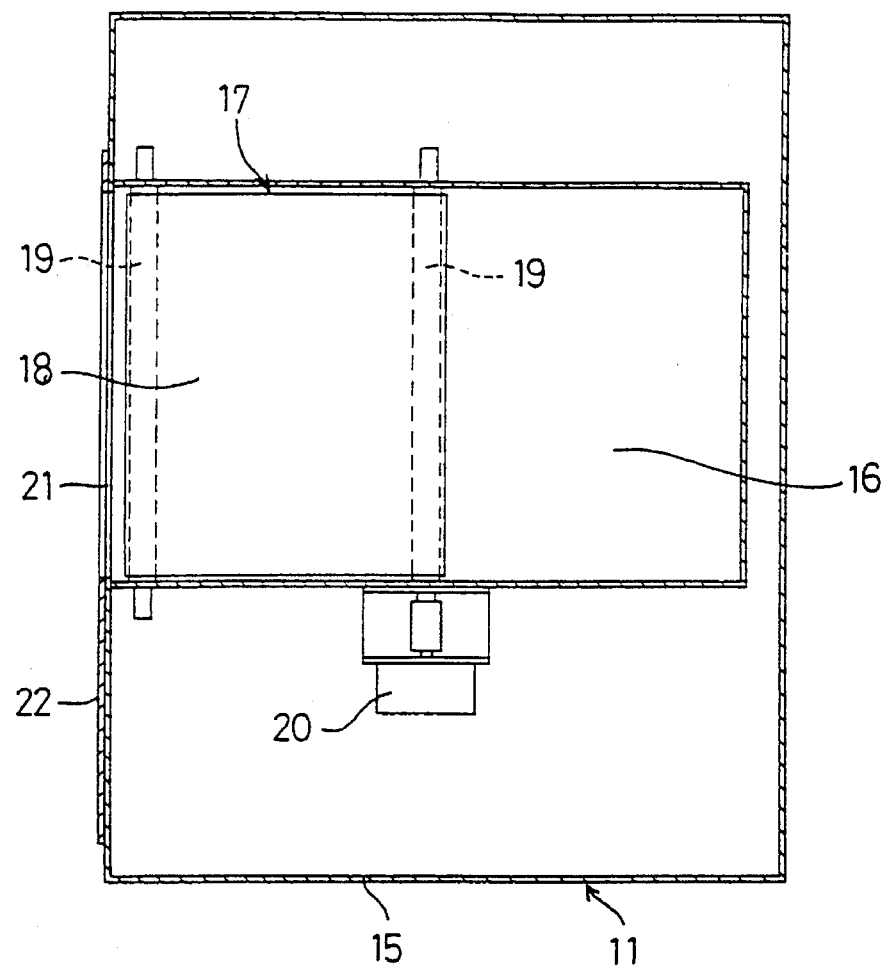
FIG. 4 is a sectional view taken along line IV—IV of FIG. 3.

FIGS. 2-4 show a drug storage/carrier device of the embodiment. In the figures, a case 15 encloses this device. It is provided over the conveyor 1 and has a discharge opening 16 in the bottom opposed to the conveyor 1.

Inside the case 15 are a plurality of drug storage/delivery conveyors 17 arranged one over another with a predetermined vertical distance. Each conveyor 17 comprises an endless belt 18 for carrying drugs, rollers 19 around which the belt 18 runs, and a motor 20 for driving one of the rollers 19. The motor 20 for each conveyor is activated by signals from the control device 12 independently of the other motors 20.

Figure 5:
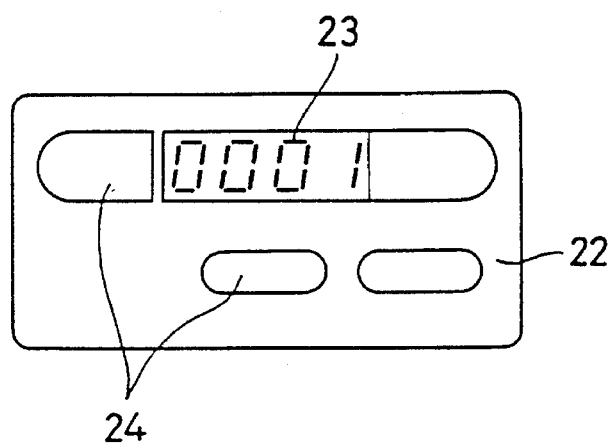
FIG. 5 is a front view of the display of the same.

The case 15 also has a plurality of inlet openings 21 at positions corresponding to the respective storage/delivery conveyors 17. On one side of each inlet 21 is a display 22 which comprises, as shown in FIG. 5, a display tube 23 that indicates a prescription number, a patient code, etc., and a plurality of control buttons 24 for manually changing over the item of information displayed on the tube 23. As shown in FIG. 6, the data displayed on the tubes 23 are controlled by a control circuit 25 connected to the control device 12 of the storage/carrier device 11.

As shown in FIG. 2, under the discharge opening 16 of the case 15, there is provided a reader 26 for reading the identification data written in the IC cards 9 attached to the buckets 2 moving on the conveyor 1. Inside the case 15 near the discharge opening 16 is a sensor 27 for detecting the drug that is discharged through the discharge opening 16. As shown in FIG. 6, the reader 26 and the discharge sensor 27 transmit signals to the control device 12 for the storage/carrier device 11.

Now we will describe the operation of this device.

Every time a doctor issues a prescription, the data written on the prescription, the prescription number, the patient code, etc. are inputted in the host computer 3 by way of the data input device 4. The host computer 3 transfers these data to the control device 8 of the packing machine 7 and the control device 12 of the storage/carrier device 11. At the same time, the identification data corresponding to the prescription number of the prescription inputted in the host computer 3 are written in the IC card 9 of each of the buckets 2 moving along the conveyor 1 by the optical transmitter 10.

Upon receiving prescription data from the host computer 3, the control device 12 of the storage/carrier device 11 stores these data in its own memory and at the same time indicates the prescription number on the display 22. Also, it causes the printer 13 to print the prescription data on a data sheet. The prescription number is indicated on one of the displays 22 that are not used at that moment (for example, in FIG. 2, the prescription number is indicated on the uppermost one of the displays that are not used).

A pharmacist at the boot 6 packs tablets in each pouch according to the prescription data on the data sheet printed out by the printer 13. The tablets packed in each pouch are hereinafter referred to as drug A. The packed drug A is inserted into one of the inlet openings 21 located beside the display 22 that indicates the same prescription number on the data sheet and stored temporarily on the corresponding storage/delivery conveyor 17.

In this way, every time prescription data are transferred from the host computer 3 to the control device 12, the prescription number contained in the prescription data is indicated on a designated display 22. The pharmacist prepares a drug A according to the prescription data and insert it into the inlet 21 located beside the designated display 22. The drug A is thus stored on the corresponding storage/delivery conveyor 17.

On the other hand, when the reader 26 detects the bucket 2 presenting the same identification number as the prescription number indicated on the display 22, it transmits a signal to the control device 12, which in turn activates the motor 20 for the corresponding storage/delivery conveyor 17 to discharge the drug A thereon into the bucket 2 through the discharge opening 16.

When the drug A drops into the bucket 2, the discharge sensor 27 detects this fact and sends a signal to the control device 12. In response, the control device 12 stops the motor 20 for the storage/delivery conveyor 17 and turns off the display 22.

Since the drug A for each patient is delivered into the bucket indicating the same identification number as that contained in the prescription data for the drug A, it is possible to collect the drug for each patient in the right bucket with high accuracy and efficiency.

In this embodiment, the drug storage/delivery means is in the form of belt conveyors. But it may be of any other means as far as it can store and discharge drugs. For example, such means may comprise a plurality of inclined chutes 30 each having a gate 31 at the front end. In this arrangement, by opening and closing the gates 31, drugs can be stored and discharged.

Also, in the above embodiment, prescription numbers are indicated on the displays 22. But, other figures and characters which can distinguish among patient codes or prescriptions may be used.

Moreover, instead of dropping the drug stored in the case 15 through the discharge opening 16 into the buckets 2, the discharge opening 16 may be connected with the conveyor 1 through a chute or a conveyor for smooth delivery of drugs into the buckets.

In the above description, the device of this invention was used to collect and carry drugs in the form of tablets. But this device can be used to collect and carry other drugs which cannot be packed mechanically, such as compresses and ointments.

What is claimed is:

1. An apparatus for storing and transporting drugs comprising a case having a drug discharge opening, a plurality of storage/delivery means mounted in said case for storing drugs and discharging them toward said drug discharge opening, said case further having a plurality of drug inlets corresponding to said respective storage/delivery means, driving means for said storage/delivery means, displays provided near said respective drug inlets and drivingly associated with said driving means, a plurality of buckets each bearing specific identification data and adapted to run along a passage connected to said drug discharge opening formed in said case, and a detector for detecting the identification data of said each bucket to send signals for driving said driving means for said each storage/delivery means.

* * * * *